E. L. RANSOME.
APPARATUS FOR LAYING AND MOLDING CONCRETE ROADWAYS, PAVEMENTS, AND THE LIKE.
APPLICATION FILED JULY 24, 1913.

1,090,229.

Patented Mar. 17, 1914.

E. L. RANSOME.
APPARATUS FOR LAYING AND MOLDING CONCRETE ROADWAYS, PAVEMENTS, AND THE LIKE.
APPLICATION FILED JULY 24, 1913.

1,090,229.

Patented Mar. 17, 1914.
6 SHEETS—SHEET 2.

E. L. RANSOME.
APPARATUS FOR LAYING AND MOLDING CONCRETE ROADWAYS, PAVEMENTS, AND THE LIKE.
APPLICATION FILED JULY 24, 1913.

1,090,229.

Patented Mar. 17, 1914.

E. L. RANSOME.
APPARATUS FOR LAYING AND MOLDING CONCRETE ROADWAYS, PAVEMENTS, AND THE LIKE.
APPLICATION FILED JULY 24, 1913.

1,090,229. Patented Mar. 17, 1914.

UNITED STATES PATENT OFFICE.

ERNEST L. RANSOME, OF PLAINFIELD, NEW JERSEY.

APPARATUS FOR LAYING AND MOLDING CONCRETE ROADWAYS, PAVEMENTS, AND THE LIKE.

1,090,229. Specification of Letters Patent. Patented Mar. 17, 1914.

Application filed July 24, 1913. Serial No. 780,960.

*To all whom it may concern:*

Be it known that I, ERNEST L. RANSOME, a citizen of the United States, and a resident of Plainfield, county of Union, State of New Jersey, have invented certain new and useful Improvements in Apparatus for Laying and Molding Concrete Roadways, Pavements, and the like, of which the following is a description in such full, clear, and exact terms as will enable any person skilled in the art to which it pertains to make and use the same.

My invention relates to a traveling mold or apparatus for laying horizontal reaches or courses of concrete work such as sidewalks, roads, pavements and the like, which apparatus belongs to that general type or class set out in my prior Patent No. 940,061 granted on the 16th day of November, 1909; that is to say, in which the mold moves with a continuous or an intermittent progression along the course of the work at a rate corresponding to the rate of formation of the work and simultaneously lays, shapes and compresses the concrete (the same in one or more layers) into its final or permanent shape.

The present invention is especially adapted for the larger class of work such for instance as sidewalks, pavements or roadways and one of the principal objects of the invention is to enable considerable lengths of concrete roadways to be built with less expenditure of time and labor than has heretofore been required.

In the construction of public roadways experience has demonstrated to engineers that a very substantial element of cost lies in the labor and time required for handling the materials of which the roadway is built, in other words, the cost of hauling the materials to the job and of the many separate times that the materials must be handled and re-handled before they are embodied in the finished roadway.

My invention seeks to reduce to the minimum re-handling of the materials and to enable them to be hauled directly to and discharged into the roadway machine, as contra-distinguished from being dumped at various points along the proposed roadway line and then rehandled from time to time during the actual construction of the roadway.

A further feature of the present invention lies in the construction and organization of the concrete mixing devices, the same being embodied in the construction of the roadway machine and which are of a peculiar character adapting them to their environment in a machine of the character referred to.

My invention involves various other features of importance all of which will be fully set forth hereinafter.

In accomplishing the objects upon which my invention depends, I organize the machine in a form of low-down construction which embodies the means for shaping and compressing the concrete in its final form, above that, the means for measuring and mixing the various ingredients and delivering them to appropriate points in the molding means, and above the mixing and measuring means, a deck with hoppers sunk therein for receiving the ingredients of the concrete and delivering them to the mixing means; the whole construction being such that the deck lies but a few feet above the ground so that a proper bridge or inclined approach may be provided and a horse-drawn or other form of vehicle wheeled or moved from the ground up on the deck of the machine and its contents dumped into the hoppers without even arresting the slow progressive movement of the apparatus in forming the sidewalk, roadway or other structure. It will be obvious that this arrangement effects the greatest saving in the labor of handling the materials of which the roadway is built because the carts may be loaded at the point of supply and drawn to and dumped directly in the machine rather than being dumped at points along the proposed roadway and shoveled and wheelbarrowed in various ways and at various times before it is finally embodied in the concrete road.

Reference is had to the accompanying drawings which represent, as an example only, preferred detailed embodiments of my invention in the form of roadway and sidewalk machines. It is plain that alterations must be made in this construction to adapt the invention to the precise character of the work laid, but these alterations will not affect the principles of my invention.

In said drawings

Figure 9:
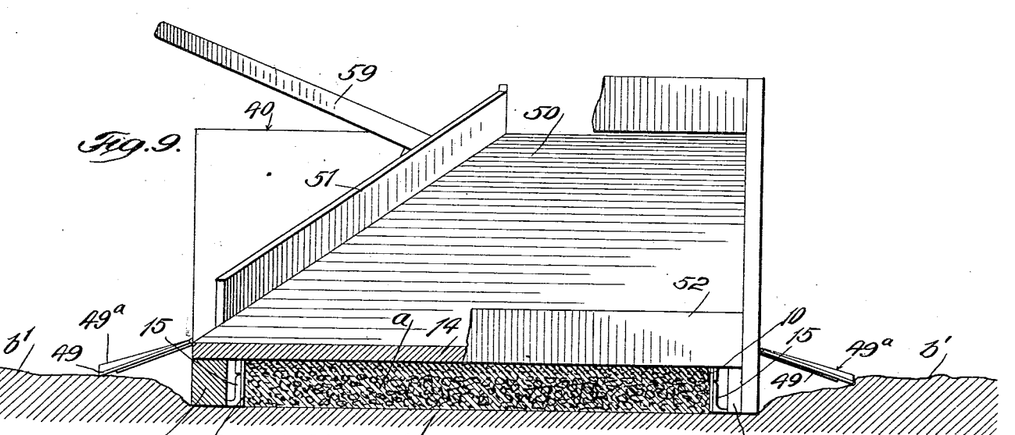
Fig. 9 is a rear elevation of the machine with parts broken away.

Referring first to Fig. 9 which best illustrates the character of the work constructed by my improved machine, $a$ indicates the concrete sidewalk, pavement or other work to be constructed, the same being laid on the earth $b$ or on a suitable foundation formed on the same. At the sides of this foundation the earth may rise slightly as indicated at $b^1$ and after the work is formed the earth at the points $b^1$ may be thrown in against the edges of the concrete $a$ and leveled off with the top surface to bring the sidewalk flush with the ground as is customary in such operations.

Figure 6:
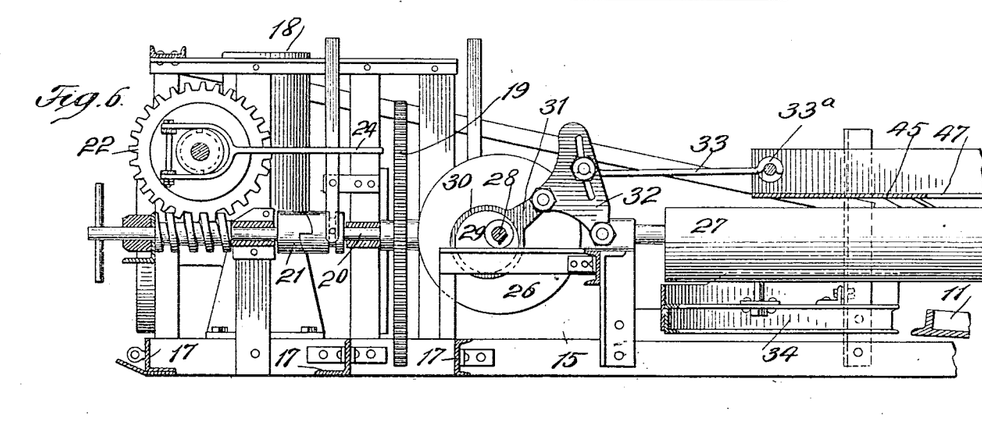
Fig. 6 is an enlarged longitudinal section of said front end of the machine and the front extremity of the middle section.
Figure 7:
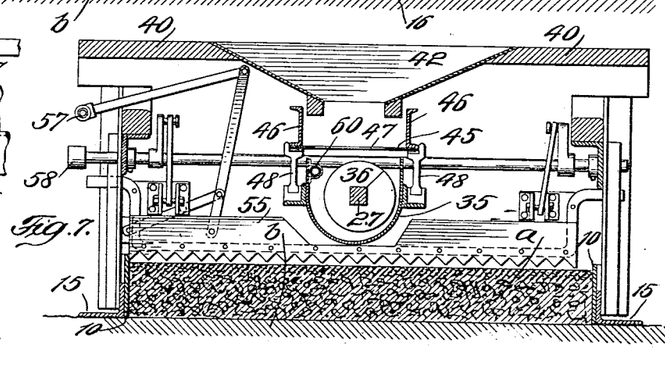
Fig. 7 is a cross section on the line 7—7 of Fig. 3.

The cross sectional form of the concrete work is shown in Figs. 7 and 9 and the molding surfaces of the machine will, of course, be disposed to conform with this cross sectional form of the work. According to this the machine has two side molding walls 10 and top molding walls 11, 12 and 13, best shown in Figs. 2, 3, 7 and 9. A platform 14 is provided at the rear of the machine for the concrete carts or barrows as will be hereinafter described which platform is in the plane of the top molding wall 13 and which may or may not furnish the final molding or top smoothing surface. At each side of the machine longitudinally extending frame elements 15 extend the length of the machine and form runners which support the main part of the machine, excepting, however, the platform 14 which is furnished with its own supporting runners indicated at 16 in Figs. 2 and 9. These longitudinally extending runners or frame members 15 are rigidly joined to each other by the various frame parts of the machine to be hereinafter described and are also rigidly joined at the front portion of the machine by connecting cross pieces 17. This forms a rectangular framework on the front end of the machine on which the power plant and gearing is mounted. As here shown this power plant and gearing comprises an oil or other engine 18 joined by gears 19 to a longitudinally disposed main driving shaft 20. One end of this shaft is connected, by a clutch 21, with gearing 22 which drives a drum 23. The drum has a suitable clutch and lever 24 for throwing it in and out of operation and said drum is designed to carry a cable. The cable is led ahead of the machine and anchored in any suitable manner so that by operating the drum to wind the cable thereon the whole machine is hauled ahead. The anchor is from time to time carried ahead of the machine to keep pace with the winding operation of the drum and in this manner the machine is hauled steadily over the road or other way progressively with the formation of the concrete work. The main driving shaft 20 has a second clutch 25 (see Fig. 1) which operates the concrete mixer shaft 27. This shaft 27 extends longitudinally through the machine under the deck of the intermediate section as will be hereinafter described. A miter gearing 26 (see Fig. 1) operates a transverse shaft 28 (see Figs. 2 and 6) on which is an eccentric 29. This eccentric, through its strap 30 and connecting rod 31, operates a rocker 32, the same being joined to a link 33 which operates the measuring devices as will also be fully set forth hereinafter. Said link 33 has a hook 33$^a$ (see Fig. 6) at its end which may be disengaged from the measuring valve at will to stop its operation, all of which will hereinafter appear.

In addition to the side molding walls 10 and top molding walls 11, 12 and 13, constituting the main molding surfaces, the intermediate section of the machine comprises a V-shaped spreader 34 (see Figs. 2 and 6) which spreader serves to level out the concrete materials and which is located directly in advance of the front top molding wall 11 and directly behind the discharging front end of the main mixer trough 39. This mixer trough (see Figs. 2, 3 and 7) extends from the spreader 34 rearward centrally in the machine and terminates just forward of the rear end of the molding wall 12. The before described mixing shaft 27 extends through the mixer trough 35 and carries the mixer blades 36 which blades are spirally disposed so that upon rotation of the shaft the materials in the trough are not only mixed but they are steadily advanced through the trough and discharged at the front end thereof directly ahead of the spreader 34 which spreader levels out the materials and prepares them for the smoothing and compressing action of the walls 11, 12 and 13. Said walls 11, 12 and 13 incline rearward as the drawings show and by reason of this inclination, and the weight of the machine, they exert a strong compression on the concrete at the same time that they smooth or level the same. The coarser grade concrete constituting the foundation or main body of the concrete course is mixed in the trough 35 and compressed by the walls 10 and 11. A gap 37 is provided between the walls 12 and 13 which is to admit of the introduction of the finer grade of concrete forming the hard finishing or top surface of the work. This top surface is delivered ahead of the wall 13 which wall compresses the same as it moves over it. This forms the concrete work, therefore, with a main or lower portion of comparatively coarse concrete materials and a comparatively thin top surface of finer grade materials as is illustrated in section in Figs. 7 and 9. The materials for this finer grade top surface are mixed in a mixer trough 38 which is located in the rear portion of the intermediate section of the machine in line with the trough 35 and through which the before described mixer shaft 27 extends. Spiral mixer blades 39 are attached to the shaft within the trough 38 and the concrete materials received in said trough are thereby simultaneously mixed and advanced to the open front end of the trough 38 and discharged through the gap 37 under the wall 13 as before described.

Figure 3:
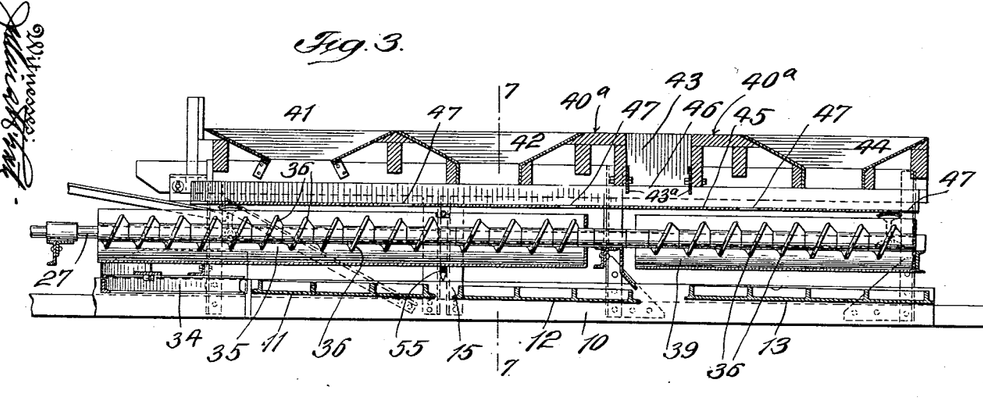
Fig. 3 is an enlarged longitudinal section of the intermediate portion of the machine, the same containing the deck and hoppers, and the measuring and mixing devices and molds proper.

40 indicates the deck or top covering of the machine which as before explained extends completely over the parts constituting the intermediate section of the apparatus and is furnished with hoppers 41, 42, 43 and 44. Of these hoppers the hoppers 41 and 42 are adapted to supply the mixer trough 35 and the hopper 44 is adapted to supply the trough 38 and hopper 43 supplies both troughs. This supply is controlled by a horizontally disposed longitudinally reciprocal measuring plate 45 which lies directly over the troughs 35 and 38 (see Figs. 3 and 7) and is furnished with side walls 46 extending up to the discharge openings of the hoppers 41, 42, 43 and 44. The measuring plate 45 has openings 47 therein, one for each hopper. The materials in the hoppers pass through the open bottoms of the hoppers and lie on the plate 45 at the angle of repose and the reciprocation of the plate alternately brings the openings 47 in and out of said angles of repose and thereby admits measured quantities of the materials to fall through the openings into the respective troughs 35 and 38. The plate 45 is sustained by rockers 48 which are mounted suitably at the sides of the mixer troughs and which allow the plate to have the above described longitudinal reciprocating movement and said movement is imparted to the measuring plate by the before described connecting rod 33 joined to the rocker 32 (see Fig. 6). Such motion may be arrested at any time by manually throwing up the link or rod 33 to disengage the hook 33ª as before described. In this manner the measuring and delivering of the concrete materials to the mixer troughs goes on in unison with the other operation of the machine, but may be stopped as desired. By furnishing the discharge openings of the hoppers with vertically adjustable transverse plates the measuring action may be regulated. In Fig. 3 the hopper 43 is shown as an example, furnished with such plates which are indicated at 43ª. By adjusting these plates vertically the angle of repose at which the materials lie on the valve plate may be changed and hence, with a given length of reciprocation of the measuring plate, the amount of the materials delivered through the openings therein will be correspondingly varied. These plates, of course, may be applied to all of the hoppers or to any of them the discharge of which is to be independently adjusted.

Figure 1:
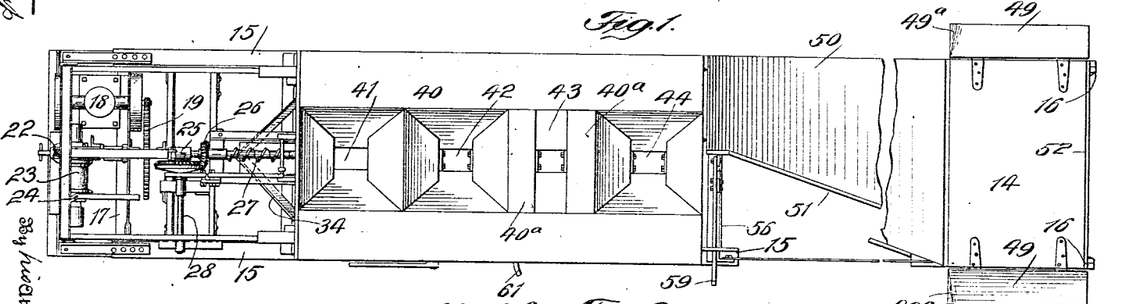
Figure 1 is a plan view of the machine in a form especially adapted for laying sidewalks.
Figure 2:
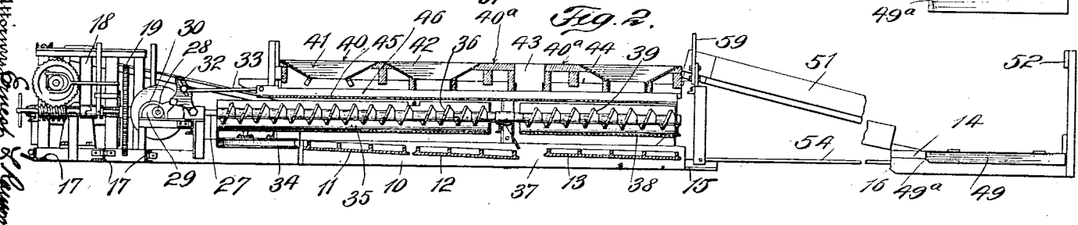
Fig. 2 is a central longitudinal section.
Figure 16:
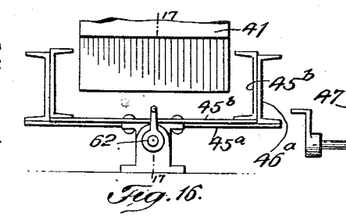
Fig. 16 is a detail view of a modification of the measuring devices and Fig. 17 is a section of the same on the line 17—17 of Fig. 16.
Figure 17:
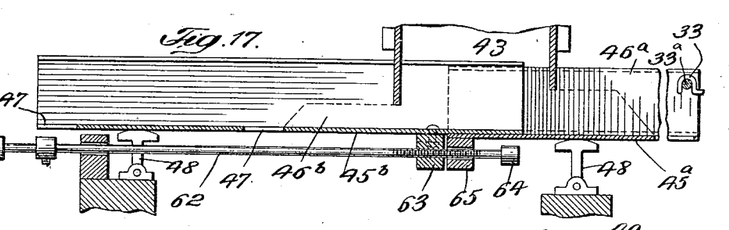

Figs. 16 and 17 show a device for regulating the stroke or reciprocation of the measuring plate and thereby regulating simultaneously the output of one hopper relatively to the other. This consists in dividing the side walls 46ª and 46ᵇ. The two sections thus formed reciprocate in unison but may be adjusted relatively to each other by a hand operated screw rod 62 operating in a nut 63 secured to the section 45ᵇ and furnished with a head 64 which engages a guide 65 on the section 45ª. With this device the section 45ª operates with a constant motion, but the length of the reciprocations of the section 45ᵇ depends upon the position of the rod 62. The rod 62 slides loosely in the guide 65 and when moving rearward the nut 63 strikes the guide and moves rearward the section 45ᵇ, while on the forward stroke of the section 45ª the head 64 engages the guide 65 and moves the section 45ᵇ. In this way the length of stroke of the section 45ᵇ is made to depend upon the position of the rod 62. The valve openings 47 are made part in the section 45ª and part in the section 45ᵇ so that the openings of one section serve one trough and the openings of the other section the other trough. In this way the machine may be adjusted to meet any condition that may be met with in practical operation. The hoppers 41, 42, 43 and 44 are, it will be observed, sunk or located below the surface of the deck 40 so that wheelbarrows, carts or other vehicles may be moved over the deck and conveniently dumped into one or the other of the hoppers. The precise manner in which the deck is laid out or designed is not material and level spaces may be provided between the hoppers over which the wheels of the barrows or carts may be moved. For example, the spaces 40$^a$ in Figs. 1 and 2 illustrate two such level spaces and others may be provided at various points in the deck as desired. The important feature is that the hoppers are located substantially in or below the level of the floor so that the contents of the carts may be dumped directly into the hoppers without any shoveling or raising of the materials from the cart or barrow.

Figure 4:
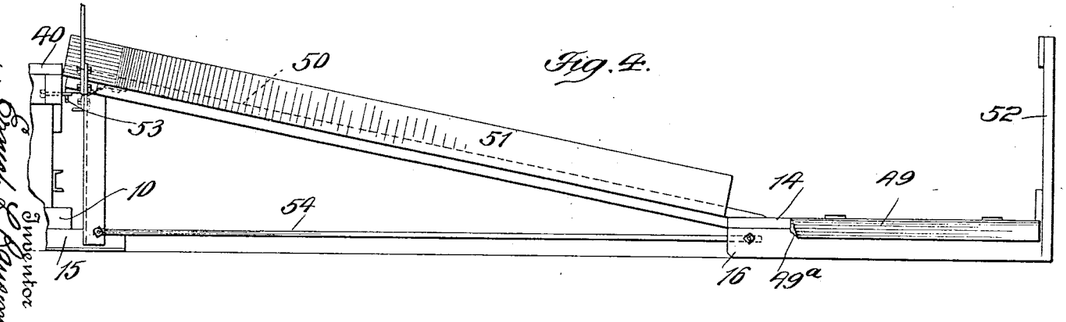
Fig. 4 is an enlarged side elevation of the rear portion of the machine, the same containing the bridge or inclined approach to the deck.
Figure 5:
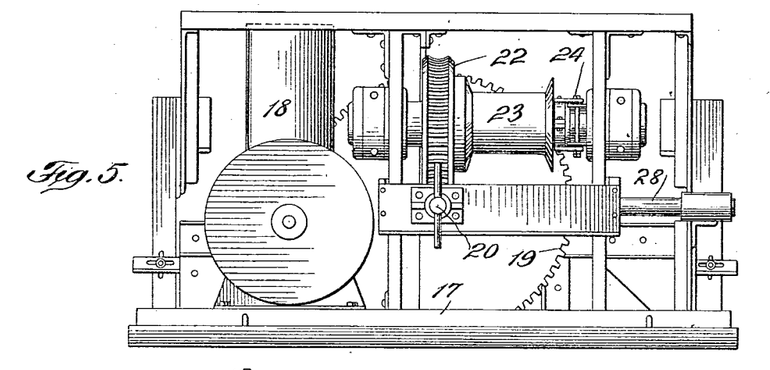
Fig. 5 is an enlarged side elevation of the front portion of the machine, the same embodying the power plant and various gear elements by which the machine is propelled along its course and the moving parts of the apparatus driven.

The before described platform 14 forming part of the rear section of the machine is provided with inclined approaches 49 at its sides (see Figs. 1 and 2), the same being hinged to the platform and having their front ends 49$^a$ turned up so that they will slide easily over the earth indicated at $b^1$ in Fig. 9. This conveniently allows the carts or barrows to be first moved over the approaches 49 and on to the platform 14 and from this the carts may be moved up along an inclined bridge 50 forming part of the rear section of the machine. This bridge preferably tapers toward the front of the machine and is furnished with a guide rail 51 at its tapering side though this is not essential. If desired a similar rail may be provided at the straight or opposite side of the bridge 50 and I also prefer to provide a rear wall or railing 52 at the rear end of the platform 14. The bridge 50 extends up to the rear end of the deck so that the carts or other vehicles may be wheeled over the bridge and directly on to the deck in the manner before described. The frame members or details of construction of the rear section of the machine are not important and will not be here described in detail. As shown best in Fig. 4 the rear section is joined to the intermediate section by a hook 53 and suitable tie rods 54.

Figure 8:
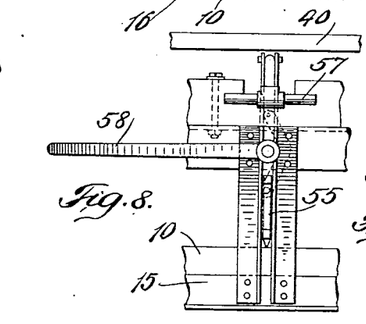
Fig. 8 is a side elevation of the parts of the machine at the line of the section of Fig. 7.
Figure 13:
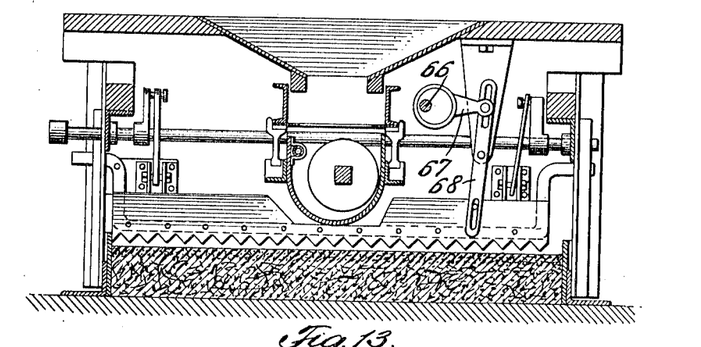
Fig. 13 is a modification of the means for forming the transverse kerf or division.

According to my prior Patent No. 1042822 issued on the 29th day of October, 1912, it is in certain cases desirable to divide the concrete work transversely at certain intervals to avoid irregular cracking of the work and to do this by suitable saws or markers mounted on the molding machine. My present invention is adapted to be equipped with these devices and they are shown in the drawings, 55 representing the front saw and 56 the rear saw. Of these saws, the saw 55 is adapted to cut the broad kerf and operates between the molding walls 11 and 12 and the saw 56 is adapted to cut the thin kerf and is located at the rear end of the intermediate section behind the molding wall 13. I will not describe in detail the devices for mounting and controlling these saws since they do not in themselves form a part of the claimed subject matter of this application. Suffice it to say that the saws are according to Figs. 3, 7 and 8 adapted to be operated manually by handle parts 57 and 58 for the front saw and a handle lever 59 for the rear saw. When these saws are operated to form the kerfs as described in my previous patent last above referred to the forward motion of the machine is, of course, arrested. These saws 55 and 56 or either of them may be operated, however, by power and this may be preferable in the larger types of machines built according to my invention. Fig. 13 shows one method of accomplishing this purpose which consists in a longitudinal lay shaft 66 suitably mounted in the machine and suitably driven from the engine or other source of power. On this shaft 66 is an eccentric and strap and rod 67 which rocks a lever 68, the same being articulated with the saw in such a manner that the saw may yet be raised and lowered as described. The motion of the lay shaft is, of course, controlled by a suitable clutch and in this way the saw may be put into operation at will.

Figure 10:
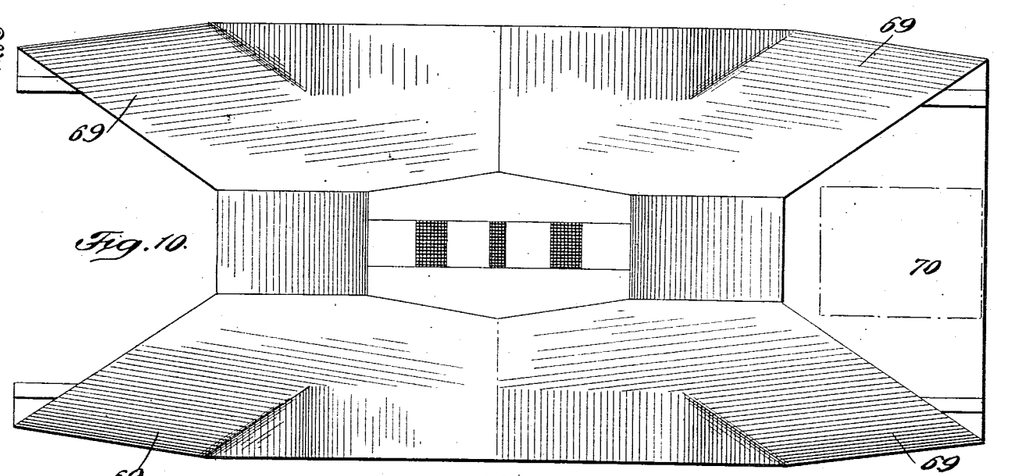
Fig. 10 is a plan view illustrating a form of deck especially adapted to a larger machine than that shown in the preceding figures, for example, a machine for laying the whole width of a roadway.
Figure 11:
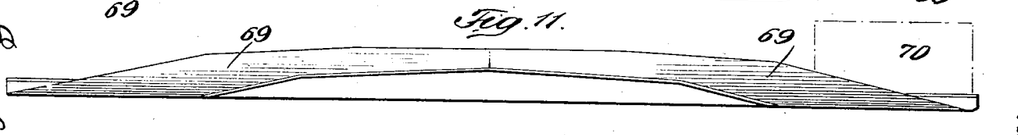
Fig. 11 is a side view of such machine.
Figure 12:
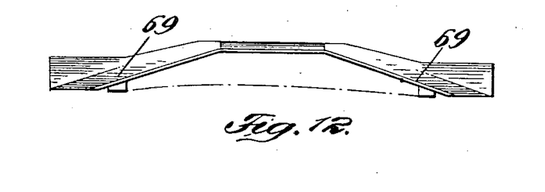
Fig. 12 is a front end elevation of the same.
Figure 14:
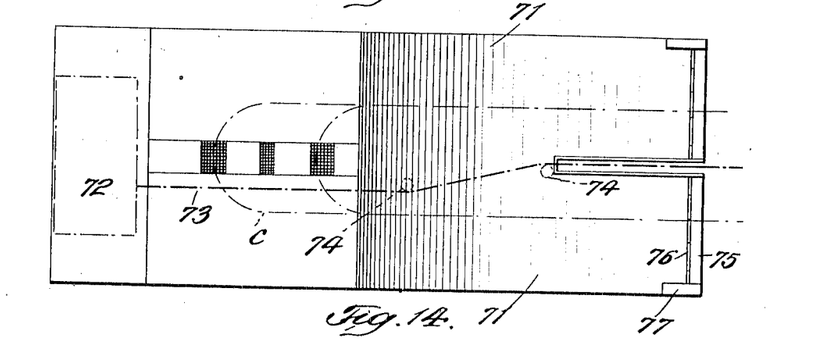
Fig. 14 is a plan view of still another form of deck.
Figure 15:
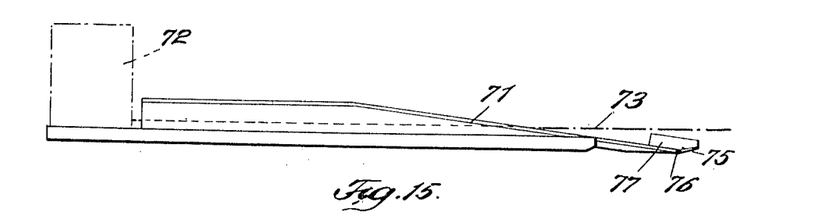
Fig. 15 is a side view of the same.

The modification in the form of deck which is shown in Figs. 10, 11 and 12 is adapted for the larger sized machines for making the whole width of road at one operation and in which the carts are drawn by horses on and over the deck. Here the deck covers all the working parts of the machine and has diagonal approaches 69 at its four corners up which the teams may draw the carts loaded with the concrete materials. In this form the power plant 70 is located in the center line at the front of the machine and the teams may pass on both sides thereof. Figs. 14 and 15 show another form of deck in which the approaches 71 are at the front of the machine and on each side and the power plant 72 is at the rear. The cable 73 runs forward past guides 74 and between the approaches 71. In order to allow the machine to be moved ahead and yet prevent the approaches 71 from plowing down into the earth, I provide shoes 75 which are disposed transversely at the front edge of the approaches and joined thereto by hinges 76. These shoes are normally tilted up (to slide easily over the earth) by means of weights 77 but when struck by the wheels of the carts they fall down to allow the wheels to pass easily over them. The dotted lines $c$ in Fig. 14 show the course of the carts in moving over the deck.

In the operation of the apparatus, the foundation of the sidewalk or pavement is first prepared to any extent that the nature of the work may require and the machine is placed in position on the same. The materials of which the concrete is formed are brought to the machine and dumped into their respective hoppers where such materials are kept stored and from which they are delivered to the mixers by the measuring valve plate 45. Water is supplied to the mixers through a water supply pipe 60 (see Fig. 7) running along the mixer troughs, the same having a hose connection 61 at the side of the machine (see Fig. 1). The operation of the mixers forms and discharges the concrete mixture as before described and the machine is drawn ahead along the foundation of the pavement or sidewalk at a speed equivalent to that of the formation of the work. The machine in moving over the concrete levels it and compresses and shapes, first the main body of the work and next the top or wearing surface. This motion goes on continuously unless or until the machine is stopped to allow the kerfs to be formed transversely in the work. The movement of the machine, of course, is slow and this slow rate of movement allows the carts or barrows to be moved on the machine and over the deck without interrupting the movement of the machine.

Having thus described my invention, what I claim as new and desire to secure by Letters Patent of the United States is:—

1. In a progressively moving machine for forming sidewalks, pavements, roadways and similar continuing horizontal reaches of concrete work, the combination of means for shaping and compressing the concrete into its final form while the machine moves over the same, means for measuring and mixing the concrete materials and delivering the concrete to said shaping and compressing means, and means for delivering the concrete materials to said measuring and mixing means comprising a deck or platform on and over which a vehicle carrying concrete materials may be moved to deliver the materials to the machine without stopping the continuous movement thereof.

2. In a progressively moving machine for forming sidewalks, pavements, roadways and similar continuing horizontal reaches of concrete work, the combination of means for shaping and compressing the concrete into its final form while the machine moves over the same, means for measuring and mixing the concrete materials and delivering the concrete to said shaping and compressing means and means for delivering the concrete materials to said measuring and mixing means comprising a deck or platform located over the said measuring and mixing means and extending down to the ground and on and over which platform or deck a vehicle carrying the concrete materials may be moved to deliver the materials to the machine without stopping the continuous movement thereof.

3. In a progressively moving machine for forming sidewalks, pavements, roadways and similar continuing horizontal reaches of concrete work, the combination of means for shaping and compressing the concrete into its final form while the machine moves over the same, means for measuring and mixing the concrete materials and delivering the concrete to said shaping and compressing means and a deck or platform extending over the measuring and mixing means and down to the ground, whereby a vehicle carrying the concrete materials may be moved on and over the deck to deliver the materials to the machine without stopping the continuous movement thereof.

4. In a progressively moving machine for forming sidewalks, pavements, roadways and similar continuing horizontal reaches of concrete work, the combination of means for shaping and compressing the concrete into its final form while the machine moves over the same, means for measuring and mixing the concrete materials and delivering the concrete to said shaping and compressing means and a deck or platform extending over the measuring and mixing means down to the ground, the deck or platform having openings therein discharging to the measuring and mixing means, whereby a vehicle carrying the concrete materials may be moved on and over the deck to deliver the materials to the machine without stopping the continuous movement thereof.

5. In a progressively moving machine for forming sidewalks, pavements, roadways and similar continuing horizontal reaches of concrete work, the combination of means for shaping and compressing the concrete into its final form while the machine moves over the same, means for measuring and mixing the concrete materials and delivering the concrete to said shaping and compressing means, the measuring and mixing means extending horizontally over the shaping and compressing means and a deck or platform extending horizontally over the measuring and mixing means and having openings discharging into the measuring means, whereby the concrete materials may be dumped from the deck into said openings.

6. In a progressively moving machine for forming sidewalks, pavements, roadways and similar continuing horizontal reaches of concrete work, the combination of means for shaping and compressing the concrete into its final form while the machine moves over the same, a mixing trough extending horizontally over the shaping and compressing means and discharging thereinto, a mixer shaft and blades extending through the trough, a measuring plate operating horizontally over the trough and shaft and a deck located horizontally over the valve and having openings the discharge wherefrom is controlled by said valve, whereby the concrete materials may be dumped from the deck into said openings.

7. In a progressively moving machine for forming sidewalks, pavements, roadways and similar continuing horizontal reaches of concrete work, the combination of means for shaping and compressing the concrete into its final form while the machine moves over the same, means for measuring and mixing the concrete materials and delivering the concrete to said shaping and compressing means, the measuring and mixing means extending horizontally over the shaping and compressing means and a deck or platform extending horizontally over the measuring and mixing means and having openings discharging into the measuring means, whereby the concrete materials may be dumped from the deck into said openings, and the deck or platform extending down to the ground to allow a vehicle bearing the concrete materials to be moved up on to the deck without interrupting the continuous movement of the machine.

8. In a progressively moving machine for forming sidewalks, pavements, roadways and similar continuing horizontal reaches of concrete work, the combination of means for shaping and compressing the concrete into its final form while the machine moves over the same, a mixing trough extending horizontally over the shaping and compressing means and discharging thereinto, a mixer shaft and blades extending through the trough, a measuring valve operating horizontally over the trough and shaft and a deck located horizontally over the valve and having openings the discharge wherefrom is controlled by said valve, whereby the concrete materials may be dumped from the deck into said openings, the deck or platform extending down to the ground to allow a vehicle bearing the concrete materials to be moved up on to the deck without interrupting the continuous movement of the machine.

9. In a progressively moving machine for forming sidewalks, pavements, roadways and similar continuing horizontal reaches of concrete work, the combination of means for shaping and compressing the concrete into its final form while the machine moves over the same, means for measuring and mixing the concrete materials and delivering the concrete to said shaping and compressing means and a deck or platform extending over the measuring and mixing means and having hoppers therein discharging to the measuring and mixing means, whereby the concrete materials may be dumped from the deck into the hoppers to supply the machine.

10. In a progressively moving machine for forming sidewalks, pavements, roadways and similar continuing horizontal reaches of concrete work, the combination of means for shaping and compressing the concrete into its final form while the machine moves over the same, means for measuring and mixing the concrete materials and delivering the concrete to said shaping and compressing means and a deck or platform extending over the measuring and mixing means and having hoppers therein discharging to the measuring and mixing means, whereby the concrete materials may be dumped from the deck into the hoppers to supply the machine and the deck or platform extending down to the ground to allow a vehicle bearing the concrete materials to be moved up on to the deck without interrupting the continuous movement of the machine.

11. In a progressively moving machine for forming sidewalks, pavements, roadways and similar continuing horizontal reaches of concrete work, the combination of means for shaping and compressing the concrete into its final form while the machine moves over the same, means for measuring and mixing the concrete materials and delivering the concrete to said shaping and compressing means and a deck or platform extending over the measuring and mixing means and having hoppers therein discharging to the measuring and mixing means, whereby the concrete materials may be dumped from the deck into the hoppers to supply the machine and vertically adjustable walls at the mouth of one or more of the hoppers to regulate the height of the angle of repose of the material or materials issuing therefrom.

12. In a progressively moving machine for forming sidewalks, pavements, roadways and similar continuing horizontal reaches of concrete work, the combination of means for shaping and compressing the concrete into its final form comprising top molding walls spaced from each other and adapted to have the concrete charged under their front ends, horizontal mixer troughs extending over the walls and respectively discharging under the front ends thereof and screw like mixer devices in the troughs and serving simultaneously to mix the concrete materials and advance them through the troughs to discharge the concrete as required.

13. In a progressively moving machine for forming sidewalks, pavements, roadways and similar continuing horizontal reaches of concrete work, the combination of means for shaping and compressing the concrete into its final form comprising top molding walls spaced from each other and adapted to have the concrete charged under their front ends, horizontal mixer troughs extending over the walls and respectively discharging under the front ends thereof, screw like mixer devices in the troughs and serving simultaneously to mix the concrete materials and advance them through the troughs to discharge the concrete as required, feeding hoppers over the mixer means to deliver the concrete materials thereto and a measuring device under said hoppers to control the supply to the mixer means.

14. In a progressively moving machine for forming sidewalks, pavements, roadways and similar continuing horizontal reaches of concrete work, the combination of means for shaping and compressing the concrete into its final form comprising top molding walls spaced from each other and adapted to have the concrete charged under their front ends, horizontal mixer troughs extending over the walls and respectively discharging under the front ends thereof, screw like mixer devices in the troughs and serving simultaneously to mix the concrete materials and advance them through the troughs to discharge the concrete as required, feeding hoppers over the mixer means to deliver the concrete materials thereto and a measuring plate reciprocating under the hoppers to control the supply to the mixing means.

15. In a progressively moving machine for forming sidewalks, pavements, roadways and similar continuing horizontal reaches for concrete work, the combination of means for shaping and compressing the concrete into its final form comprising top molding walls spaced from each other and adapted to have the concrete charged under their front ends, horizontal mixer troughs extending over the walls and respectively discharging under the front ends thereof, screw like mixer devices in the troughs and serving simultaneously to mix the concrete materials and advance them through the troughs to discharge the concrete as required, feeding hoppers over the mixer means to deliver the concrete materials thereto and a measuring device under said hoppers to control the supply to the mixer means and a deck or platform level with the hoppers and extending down to the ground for the purpose specified.

16. In a progressively moving machine for forming sidewalks, pavements, roadways and similar continuing horizontal reaches of concrete work, the combination of means for shaping and compressing the concrete into its final form comprising top molding walls spaced from each other and adapted to have the concrete charged under their front ends, horizontal mixer troughs extending over the walls and respectively discharging under the front ends thereof, screw like mixer devices in the troughs and serving simultaneously to mix the concrete materials and advance them through the troughs to discharge the concrete as required, feeding hoppers over the mixer means to deliver the concrete materials thereto, a measuring plate reciprocating under the hoppers to control the supply to the mixing means and vertically adjustable walls at the discharge of one or more of the hoppers to regulate the height of the angle of repose of the materials flowing therefrom for the purpose specified.

17. In a progressively moving machine for forming sidewalks, pavements, roadways and similar continuing horizontal reaches of concrete work, the combination of means for shaping and compressing the concrete into its final form comprising top molding walls spaced from each other and adapted to have the concrete charged under their front ends, horizontal mixer troughs extending over the walls and screw like mixer devices in the troughs and serving simultaneously to mix the concrete materials and advance them through the troughs to discharge the concrete as required, feeding hoppers over the mixer means to deliver the concrete materials thereto and a measuring plate reciprocating under the hoppers to control the supply to the mixing means, said measuring plate being formed in two sections and means for adjusting the sections relatively to adjust the stroke of the plate.

18. In a progressively moving machine for forming sidewalks, pavements, roadways and similar continuing horizontal reaches of concrete work, the combination of means for shaping and compressing the concrete into its final form comprising top molding walls spaced from each other and adapted to have the concrete charged under their front ends, horizontal mixer troughs extending over the walls and respectively discharging under the front ends thereof, screw like mixer devices in the troughs and serving simultaneously to mix the concrete materials and advance them through the troughs to discharge the concrete as required, feeding hoppers over the mixer means to deliver the concrete materials thereto and a measuring plate reciprocating under the hoppers to control the supply to the mixing means and means for regulating the stroke of the measuring plate.

19. In a progressively moving machine for forming sidewalks, pavements, roadways and similar continuing horizontal reaches of concrete work, the combination with the feed hoppers and mixing means below the same, of the measuring plate in two sections, means for reciprocally driving one section and means for joining the two sections with a variable degree of lost motion between them, for the purpose set forth.

20. In a progressively moving machine for forming sidewalks, pavements, roadways and similar continuing horizontal reaches of concrete work, the combination of means for shaping and compressing the concrete into its final form comprising top molding walls spaced from each other and adapted to have the concrete charged under their front ends, horizontal mixer troughs extending over the walls and respectively discharging under the front ends thereof, screw like mixer devices in the troughs and serving simultaneously to mix the concrete materials and advance them through the troughs to discharge the concrete as required and a leveler or spreader mounted on the machine head of the front top molding wall.

21. In a progressively moving machine for forming sidewalks, pavements, roadways and similar continuing horizontal reaches of concrete work, the combination of means for shaping and compressing the concrete into its final form while the machine moves over the same, means for measuring and mixing the concrete materials and delivering the concrete to said shaping and compressing means, and means for delivering the concrete materials to said measuring and mixing means comprising a deck or platform on and over which a vehicle carrying concrete materials may be moved to deliver the materials to the machine without stopping the continuous movement thereof, the deck extending to the ground at the front portion of the machine so that the vehicle in moving on the machine may be advanced to the front thereof.

22. In a progressively moving machine for forming sidewalks, pavements, roadways and similar continuing horizontal reaches of concrete work, the combination of means for shaping and compressing the concrete into its final form while the machine moves over the same, means for measuring and mixing the concrete materials and delivering the concrete to said shaping and compressing means, and means for delivering the concrete materials to said measuring and mixing means comprising a deck or platform on and over which a vehicle carrying concrete materials may be moved to deliver the materials to the machine without stopping the continuous movement thereof, the deck extending to the ground at the front portion of the machine so that the vehicle in moving on the machine may be advanced to the front thereof, a shoe mounted to swing at the front edge of the deck and means for yieldingly holding the shoe raised from the ground.

23. The combination of a plurality of feed hoppers adapted to receive concrete forming ingredients, two mixing chambers below the same, a measuring and distributing means for controlling the movement of the said ingredients into the hoppers, and mixing elements in said chambers and joined together to operate simultaneously, whereby two unlike grades of concrete may be mixed simultaneously and means for adjusting the measuring and distributing means to relatively vary the amounts delivered to the mixing chambers.

24. In a progressively moving machine for forming sidewalks, pavements, roadways and similar continuing horizontal reaches of concrete work, the combination of means for delivering the concrete to its final position in the sidewalk, pavement, roadway, etc., means for mixing the materials of which the concrete is formed and delivering the concrete to the first mentioned means and means for delivering the concrete materials to said mixing means, comprising a deck or platform on and over which a vehicle carrying the concrete materials may be moved to deliver the concrete materials to the machine without stopping the continuous movement thereof.

25. In a progressively moving machine for forming sidewalks, pavements, roadways and similar continuing horizontal reaches of concrete work, the combination of means for delivering the concrete to its final position in the sidewalk, pavement, roadway, etc., means for mixing the materials of which the concrete is formed and delivering the concrete to the first mentioned means and a deck or platform extending over the mixing means and down to the ground whereby a vehicle carrying the concrete materials may be moved on and over the deck to deliver the materials to the machine without stopping the continuous movement thereof.

In testimony whereof I have hereunto signed my name in the presence of two witnesses.

ERNEST L. RANSOME.

Witnesses:
SYDNEY H. GIELLERUP,
ISAAC B. OWENS.